United States Patent
Wilde

(10) Patent No.: US 10,447,803 B2
(45) Date of Patent: Oct. 15, 2019

(54) PREDICTIVE LOCAL PRE-CACHE FOR REDUCED LATENCY DIGITAL CONTENT ACCESS RIGHTS DETERMINATION

(71) Applicant: Microsoft Technology Licensing, LLC, Redmond, WA (US)

(72) Inventor: Benjamin Wilde, Quincy, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 242 days.

(21) Appl. No.: 15/483,801

(22) Filed: Apr. 10, 2017

(65) Prior Publication Data

US 2018/0295203 A1  Oct. 11, 2018

(51) Int. Cl.
G06F 15/16 (2006.01)
H04L 29/08 (2006.01)
H04L 29/06 (2006.01)
G06F 21/60 (2013.01)

(52) U.S. Cl.
CPC ........ *H04L 67/2842* (2013.01); *G06F 21/604* (2013.01); *H04L 63/101* (2013.01); *H04L 67/22* (2013.01)

(58) Field of Classification Search
USPC ....... 707/722, 749, 751; 705/14.53; 345/440
See application file for complete search history.

(56) References Cited

U.S. PATENT DOCUMENTS

| 8,180,804 | B1 | 5/2012 | Narayanan et al. |
| 8,417,666 | B2 | 4/2013 | Bailor et al. |
| 8,924,465 | B1 | 12/2014 | Tunguz-Zawislak |
| 9,104,892 | B2 | 8/2015 | Le Chevalier et al. |
| 2008/0071872 | A1 | 3/2008 | Gross |
| 2010/0257239 | A1 | 10/2010 | Roberts |

(Continued)

FOREIGN PATENT DOCUMENTS

| WO | 2010048172 A1 | 4/2010 |
| WO | 2016131044 A1 | 8/2016 |

OTHER PUBLICATIONS

"International Search Report & Written Opinion Issued in PCT Application No. PCT/US2018/025615", dated Jul. 3, 2018, 14 Pages.

(Continued)

*Primary Examiner* — Quang N Nguyen
(74) *Attorney, Agent, or Firm* — Watson Patents, PLC; Vladan M. Vasiljevic

(57) ABSTRACT

To reduce the latency introduced by network communications, the access rights to digital content of various users is locally cached, and such a local cache is referenced without incurring network communication latency. The local cache is predictive in that it can comprise users which a user editing the digital content is more likely to reference in the future, thereby triggering a determination as to whether such users have access rights to the digital content. The predictive aspects of the local cache are informed by a social graph delineating relationships between a user editing the digital content and other users. The social graph can be further refined based on metadata about the digital content, or based on the digital content itself. In addition to comprising users who have access rights to the digital content, the local cache can also comprise users that have been determined to not have access rights.

20 Claims, 4 Drawing Sheets

(56) References Cited

U.S. PATENT DOCUMENTS

| | | |
|---|---|---|
| 2012/0324027 A1 | 12/2012 | Vaynblat et al. |
| 2013/0318589 A1 | 11/2013 | Ford et al. |
| 2015/0370909 A1 | 12/2015 | Volach |
| 2016/0162502 A1* | 6/2016 | Zhou .................. G06F 16/90324 707/722 |
| 2016/0162938 A1* | 6/2016 | LeBeau .............. G06Q 30/0255 705/14.53 |
| 2016/0170991 A1* | 6/2016 | Birchall ............ G06F 16/24578 707/751 |
| 2016/0179965 A1* | 6/2016 | Bhatia ............... G06F 17/30867 707/749 |
| 2016/0195404 A1* | 7/2016 | Prasad ................... G06Q 50/01 345/440 |
| 2016/0315902 A1* | 10/2016 | Silva ....................... H04L 51/32 |
| 2017/0118304 A1* | 4/2017 | Ratiu ...................... H04L 67/42 |
| 2017/0185268 A1* | 6/2017 | Zeng .................. G06F 3/04845 |

OTHER PUBLICATIONS

Bernstein, et al., "Enhancing Directed Content Sharing on the Web", In Proceedings of SIGCHI Conference on Human Factors in Computing Systems, Apr. 10, 2010, pp. 971-980.

Voida, et al., "Share and Share Alike: Exploring the User Interface Affordances of File Sharing", In Proceedings of SIGCHI Conference on Human Factors in Computing Systems, Apr. 22, 2006, pp. 221-230.

Schwartz, et al., "Discovering Shared Interests Using Graph Analysis", In Communications of the ACM Special Issue on Internetworking, vol. 36, Issue 8, Aug. 1993, pp. 78-89.

Roth, et al., "Suggesting (More) Friends Using the Implicit Social Graph*", In Proceedings of 28th International Conference on Machine Learning, Jun. 28, 2011, 11 pages.

* cited by examiner

PREDICTIVE LOCAL PRE-CACHE FOR REDUCED LATENCY DIGITAL CONTENT ACCESS RIGHTS DETERMINATION

BACKGROUND

Increasingly, content creation on computing devices is a collaborative effort among multiple different, independent users, often accessing and editing the content at different times and through different computing devices. Correspondingly, content creation computer application programs are increasingly being designed to facilitate such collaborative efforts. For example, content creation computer application programs can enable users to share the content they are creating within such application programs with other users, notify other users of the created content, or otherwise link such other users to the content.

In certain instances, however, it can be disadvantageous to inform other users of content that is created within content creation computer application programs. For example, the content itself can be of a sensitive nature such that only specific users should be able to even view such content. As another example, knowledge of the mere existence of the content can be troublesome, and only specific users should be even aware of its existence. In such instances, users may run afoul of societal or workplace conventions, or even civil or criminal laws if such content is shared with the wrong users, or the wrong users are otherwise provided access to, information about, or notifications of, such content.

Consequently, content creation computer application programs can seek to notify users before content is automatically shared with other users. For example, if a user performs an action within a content creation computer application program, where such an action would trigger a notification, associated with such content, to be generated and transmitted to another, different user, the user whose action would trigger such a notification can be informed of the impending notification so that such a user can disallow the notification if the other user was identified in error, or if such a notification is contrary to the editing user's intent. In order to generate such notifications, content creation computer application programs typically verify whether the user to whom such a notification would be generated already has access to the content. Obviously, there is no need to alert the user that another user may receiving notification associated with the content if that other user is already aware of, and has access to the content.

Checking whether a user has access to content, however, can require communicating with one or more remote computing devices, such as through a computer network. In certain instances, the latency introduced with such network communications can result in a poor user experience. For example, if such network communications result in a high latency, the editing user can be informed that their actions would trigger notification at a time that is too far removed from the action itself, such that user confusion results. As another example, if such network communications result in a high latency, the user interface of the content creation computer application program can pause, hang, or otherwise become nonresponsive, again resulting in a poor user experience.

SUMMARY

To reduce the latency introduced by network communications, the access rights to digital content of various users can be locally cached, and such a local cache can be referenced without incurring network communication latency. The local cache can be predictive in that it can comprise users which a user editing the digital content is more likely to reference in the future, thereby triggering a determination as to whether such users have access rights to the digital content. The predictive aspects of the local cache can be informed by a social graph delineating relationships between a user editing the digital content and other users. The social graph can be further refined based on metadata about the digital content, or based on the digital content itself. In addition to comprising users who have access rights to the digital content, the local cache can also comprise users that have been determined to not have access rights.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
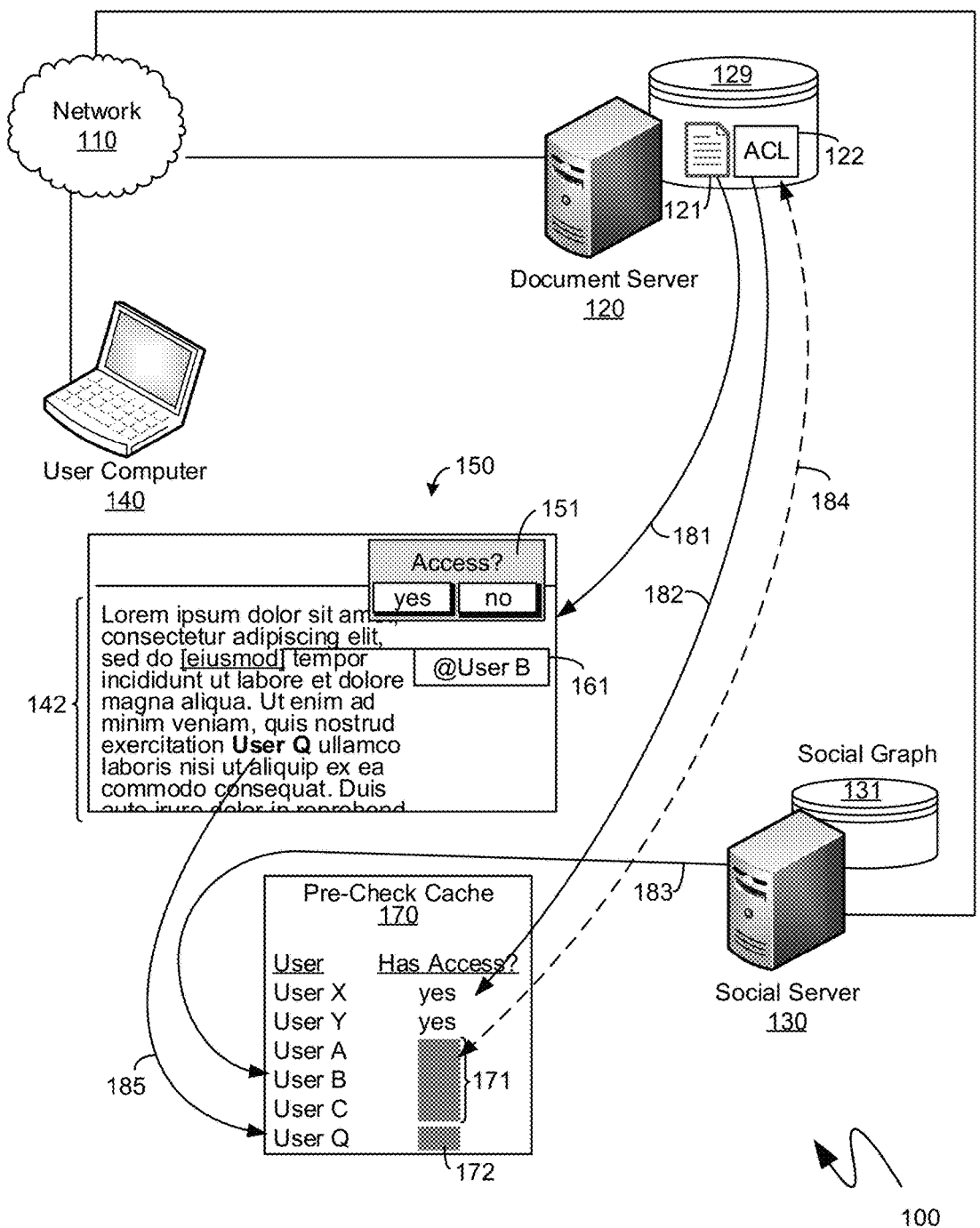
FIG. 1 is a system diagram of an exemplary system for locally pre-caching access rights to digital content.

The following description relates to the determination of access rights to digital content by reference to a predictive local cache, thereby avoiding the latency introduced by network communications, to the extent that the required information can be sourced from the local cache. The local cache can be predictive in that it can comprise users which a user editing the digital content is more likely to reference in the future, thereby triggering a determination as to whether such users have access rights to the digital content. The predictive aspects of the local cache can be informed by a social graph delineating relationships between a user editing the digital content and other users. The social graph can be further refined based on metadata about the digital content, or based on the digital content itself. In addition to comprising users who have access rights to the digital content, the local cache can also comprise users that have been determined to not have access rights.

The techniques described herein make reference to "communication endpoints", rather than the more ambiguous term "user". As utilized herein, the term "communication endpoint" means a uniquely identifiable endpoint for digital communication, such as an email address, a telephone number, such as for purposes of text messaging and other like digital communication, or any other like digital communication address, or other uniquely identifiable endpoint. By contrast, the term "user", utilized herein as that term is traditionally utilized by those of skill in the art, means a unique human. Thus, a single user may be reachable through multiple communication endpoints, such as multiple email addresses, text messaging numbers, and other like communication endpoints. Depending on the manner in which access rights to digital content are granted, maintained and enforced, a user's access to digital content will be defined in terms of one or more of such communication endpoints.

The techniques described herein also make reference to a "social graph". As utilized herein, the term "social graph" means a delineation, or other quantification, of relationships between users as determined based on amalgamated user data comprising at least some prior user actions, as well as explicitly defined organizational relationships.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. The exemplary system 100 can include, but is not limited to, one or more user-controlled computing devices, such as the exemplary user computing device 140, which can be communicationally coupled to a network, such as the exemplary network 110. Although illustrated as a laptop computing device, the exemplary user computing device 140 can be a desktop computing device, a tablet computing device, smartphone computing device or any other like user-controlled computing device.

Additionally, the exemplary system 100 can include a document server, such as the exemplary document server 120, or any other like remote computing device which can be a source for information regarding access rights to digital content. In the exemplary system 100, the exemplary document server 120 can be communicationally coupled to a database, such as exemplary database 129, on which can be stored both digital content, such as exemplary digital content 121, as well as associated access rights information, such as in the exemplary access control list 122.

According to one aspect, a user utilizing the user computing device 140 can open the digital content 121, on the user computing device 140, in order to enable the user to edit the digital content 121 on the user computing device 140. For example, the digital content 121 can be textual or multimedia content, such as can be edited within a word processing application program. As another example, the digital content can be spreadsheet content, such as can be edited within a spreadsheet application program. As yet another example, the digital content can be multimedia or hypermedia presentation content, such as can be edited with a presentation application program. Within the exemplary system 100 of FIG. 1, the exemplary digital content 121 is illustrated as a word processing document comprising text 142, shown displayed on an exemplary user interface 150, such as can be generated by a word processing application program, or other like digital content editing program, on a display device communicationally coupled to the exemplary user computing device 140.

In editing the digital content 121, a user, such as the user of the exemplary computing device 140, can perform actions with respect to the digital content that can result in the digital content, or information about the digital content, being shared with other users. For example, a user editing the digital content 121 can insert a comment, such as the exemplary comment 161, which utilizes a specific nomenclature, such as the "@" symbol, to direct a such a comment to another user. The insertion of such a comment, with corresponding nomenclature directing the comment to another user, can trigger such other user to be notified of the digital content 121, so that such other user can respond to the comment 161. Other mechanisms that can trigger notification to other users, including notifications that the digital content 121 exists, has been edited, has been commented, or notifications that comprise some or all of the digital content 121 itself, such as the text 142, can equally benefit from the mechanisms described herein.

As indicated previously, in certain instances, it can be disadvantageous to trigger a user notification associated with digital content to be delivered to an incorrect user. For example, the exemplary digital content 121 can be a list of employees that are to be fired. Sharing such content with a human resources employee can be appropriate, while sharing such content with another employee whose name, email alias, text notification number, or other like communication endpoint is similar to that human resources employee can be disadvantageous, and possibly result in civil or criminal penalties if that other user is, for example, one of the people to be fired. Indeed, as indicated previously, the mere existence of digital content may be disadvantageous to inappropriately share. Thus, continuing with the above example, a document comprising a list of employees that are to be fired, entitled, for example, "April 2017 Layoff Candidates", can result in negative experiences should the mere existence of a document carrying such a title be disclosed to an unintended user, such as another user within the company, irrespective of whether such a user is actually one of the employees listed in the document. Consequently, when content editing application programs, such as the exemplary word processing application program whose exemplary user interface 150 is shown in FIG. 1, detect user actions that can trigger notifications associated with the content to be generated and provided to other users, such as the exemplary user action in inserting the exemplary comment 161 referencing another user, a user interface element, such as the exemplary user interface element 151, can be generated to confirm the editing user's intent before generating the corresponding notification to the recipient user.

More specifically, according to one aspect, when a user action that would trigger a sharing of at least some aspect of the digital content with another user is detected, an access control list associated with the digital content can be referenced. If the recipient user already has access rights to the digital content, such as delineated by the access control list, then no further verification action need be performed. However, if the recipient user does not have access rights, such as delineated by the access control list, then a user interface element, such as the exemplary user interface element 151, can be generated to confirm with the editing user their intent to share at least some aspect of the digital content 121 with a recipient user that was identified in the editing user's action. Such confirmation can enable the editing user to detect a mistake and prevent inadvertent disclosure of the digital content 121, its existence, or any aspects or content thereof, before it is too late.

As detailed previously, however, the network communications between the exemplary user computing device 140 and the exemplary document server 120 required to enable processes executing on the exemplary user computing device 140 to check the exemplary access control list 122 can introduce unacceptable latency. For example, upon the user entering the exemplary comment 161, the exemplary user interface 150 can stop responding to further user input, or otherwise remain in a fixed state, until such network communications are completed, in order to determine whether to display the exemplary user interface element 151 before the user proceeds with further editing beyond the entry of the exemplary comment 161. Such a lag or delay in the user interface can result in user confusion, and an otherwise poor or unacceptable user experience. As another example, upon the user entering the exemplary comment 161, the user can be allowed to continue editing the text 142 until such time as the network communications between the exemplary user computing device 140 and the exemplary document server 120, through which processes executing on the exemplary user computing device 140 check the exemplary access control list 122, are completed. At such a time, if the exemplary access control list 122 indicates that the user referenced in the comment 161 does not have access rights, the exemplary user interface element 151 can be presented. However, the presentation of the exemplary user interface element 151 can occur sufficiently delayed that the user has moved on past the entering of the exemplary comment 161, and no longer recognizes that the exemplary user interface element 151 was triggered by, and is otherwise associated with, the user's action in generating the comment 161. Consequently, such a delay can result in user confusion, and, again, a suboptimal user experience.

According to one aspect, therefore, a local pre-check cache 170 can be created on the same computing device on which the exemplary digital content 121 is being edited, such as the exemplary user computing device 140, thereby enabling a determination of whether a user referenced by the editing user already has access rights to the digital content 121, for purposes of determining whether to display a user interface element, such as the exemplary user interface element 151. More specifically, when a user editing the exemplary digital content 121 on the exemplary user computing device 140 performs an action with respect to the digital content 121, such as the insertion of the exemplary comment 161, that requires a check to be made as to whether communication endpoint already has access rights to the digital content 121, such as for purposes of determining whether to display a user alert, such as the exemplary user interface element 151, that check can be directed first to the local cache 170, and, to the extent that the local cache 170 can provide the relevant access rights information, a decision regarding the display of the exemplary user interface 151, for example, can be made more quickly and without the latency and delay introduced by the aforementioned network communications between exemplary user computing device 140 in the exemplary document server 120. The corresponding user experience, in either being displayed exemplary user interface 151, or in being allowed to continue editing the exemplary digital content 121 without any lags or delays, can result in a more desirable and more efficient user experience.

To create such a local cache, such as the exemplary local cache 170, information regarding individual communication endpoints, and corresponding access rights information, indicating whether those individual communication endpoints have access rights to the exemplary digital content 121, can be obtained from the exemplary access control list 122, and can be stored in the exemplary local cache 170, as illustrated by the arrow 182. In some instances, the exemplary access control list 122 can maintain access rights information both on an individual communication endpoint basis, as well as a group basis, where such a group can be comprised of multiple users, or, more specifically, multiple communication endpoints, or one or more layers of subgroups comprised of multiple communication endpoints. As will be recognized by those skilled in the art, the precise communication endpoints of the group can change over time and, consequently, when reference is made to an access control list, such as exemplary access control list 122, for purposes of determining whether a communication endpoint has previously been granted access rights, any groups identified in such an access control list can be iterated through at the time that such an access control list is consulted. Consequently, according to one aspect, when populating the local cache 170, such as illustrated by the arrow 182, only individual communication endpoint access right information can be obtained from the access control list 122 and retained in the local cache 170. According to an alternative aspect, however, the local cache 170 can be populated with group information as well.

To increase the utility of the local cache 170, existing information about the user editing the digital content 121, such as through the user computing device 140, as well as other information, can be utilized to anticipate, or predict, other users, or, more precisely, other communication endpoints, that the editing user may reference within their edits of the digital content 121, thereby triggering a determination as to whether those communication endpoints have access rights to the digital content 121. More specifically, the local cache 170 can be populated with communication endpoints that may not yet have access rights to the exemplary digital content 121. To the extent that such communication endpoints are subsequently referenced by a user editing the exemplary digital content 121 on the exemplary user computing device 140, reference can be made to the local cache 170 to, again, avoid the latency and delay introduced in checking the exemplary access control list 122 from the user computing device 140, thereby resulting in an improved user experience and more efficient user editing of the exemplary digital content 121. Consequently, it can be desirable to populate the local cache 170 with communication endpoints that are more likely than other communication endpoints to be referenced by the user in editing exemplary digital content 121 in a manner that requires the aforementioned determination of whether certain communication endpoints have access rights to the exemplary digital content 121.

According to one aspect, therefore, a social server, such as the exemplary social server 130, can be polled, such as by processes executing on the exemplary user computing device 140 and generating the local cache 170, and other communication endpoints can be obtained therefrom. More specifically, the social server 130 can maintain a social graph, such as exemplary social graph 131, that can quantify, or otherwise delineate, relationships among multiple different users. The relationships delineated by the exemplary social graph 131 can include explicitly defined relationships, such as the relationships among users that have been placed within a single group, alias, or other like single reference within the context of digital communications. As another example of explicitly defined relationships, the relationships delineated by the exemplary social graph 131 can include managerial, organizational chart relationships, such as which users report to which managing users, each can be common in business environments. The relationships delineated by the exemplary social graph 131 can also include implicitly defined relationships, such as relationships identified by actions of one or more users. For example, repeated instances of one user sharing a document with another user can result in a relationship being delineated between the two users by the exemplary social graph 131. As another example, repeated email communications between two users can result in a relationship being delineated between them by the exemplary social graph 131. As yet another example, users that are invited to the same meetings or events, such as through a shared calendaring service, can have a relationship delineated between them, based on such common meetings or events, by the exemplary social graph 131. The precise manner in which relationships between users are delineated in the exemplary social graph 131, and the precise manner in which the strength of those relationships is quantified, can be immaterial to the mechanisms described herein, since the exemplary social graph 131 is only utilized to populate the local cache 170 with communication endpoints that are more likely than other communication endpoints to be subsequently referenced by a user editing the exemplary digital content 121, such that there is a decreased chance that the local cache 170 will not comprise the relevant access rights information, thereby requiring incurring the latency introduced by, and the delay associated with, network communications in checking the exemplary access control list 122.

Turning back to FIG. 1, as illustrated by the arrow 183, one or more communication endpoints can be obtained from the social server 130. According to one aspect, processes executing on the exemplary user computing device 140 can request the one or more communication endpoints from the social server 130 based on an identity of the user editing the exemplary digital content 121 on the exemplary user computing device 140. For example, the social server 130 can be requested to provide the strongest ten, twenty, or other like maximum threshold quantity of communication endpoints was a relationship with the user, as delineated by the exemplary social graph 131, is stronger than the relationship between the user and any other communication endpoints. As another example, the social server 130 can be requested to provide any communication endpoints whose relationship with the user, as delineated by the exemplary social graph 130, is quantified to have a strength of relationship above a specified threshold minimum strength of relationship. As yet another example, combinations of such thresholds can be utilized. FIG. 1 exemplarily illustrates three communication endpoints, identified as "User A", "User B" and "User C", being received from the social server 130, as illustrated by the arrow 183, and stored in the local cache 170 by processes executing on the exemplary user computing device 140. As indicated previously, such communication endpoints can be email aliases of users A, B and C, text messaging addresses, or other like communication endpoints associated with particular users.

As received from the social server 130, however, the access rights 171 of such communication endpoints with respect to the exemplary digital content 121 can be unknown. Accordingly, as represented by the dashed arrow 184, processes executing on the exemplary user computing device 140, and generating and maintaining the local cache 170, can reference the exemplary access control list 122, and obtain therefrom access rights information corresponding to the communication endpoints obtained from the social server 130. Because the obtaining of such access rights information can occur at a time prior to the user having performed an action, with respect to the exemplary digital content 121, that requires determining whether or not to generate the exemplary user interface element 151, the obtaining of such access rights information can occur in the background, and can otherwise not disrupt, or delay, the user in editing exemplary digital content 121. Instead, the obtaining of such access rights information is being performed in advance, and is being pre-cached.

According to one aspect, the communication endpoints received from the social server 130, such as represented by the arrow 183 in FIG. 1, can first be checked against access rights information already stored in the cache 170. According to such an aspect, if one or more of the communication endpoints received from the social server 130 are already in the cache 170, then such communication endpoints need not be further verified with the exemplary access control list 122, and, instead, only communication endpoints, received from the exemplary social server 130, not already enumerated within the cache 170, can have their access rights information obtained from the access control list 122, and then stored in the local cache 170 in the form of corresponding access rights indicators.

In addition to comprising access rights indicators that indicate that a corresponding communication endpoint has access rights to the exemplary digital content 121, the exemplary local cache 170 further comprise access rights indicators that indicate a corresponding communication endpoint does not have access rights exemplary digital content 121. More specifically, having incurred the communicational cost, and attendant delay, and communicating with a remote access control lists, such as exemplary access control list 122, to the extent that access control information received from such an exemplary access control list 122 indicates that a communication endpoint, such as one of the communication endpoints provided by these every social server 130, does not have access rights to the exemplary digital content 121, such information, indicative of the lack of access rights by such a communication endpoint, can be stored in the exemplary local cache 170 such that subsequent reference to the exemplary local cache 170 can still learn of such a lack of access rights without having to incur the latency delay associated with the aforementioned network communications all over again.

According to one aspect, the communication endpoints identified by the exemplary social server 130, such as based on the exemplary social graph 131, can be further refined based on additional information, such as metadata associated with the digital content 121. More specifically, rather than simply requesting the communication endpoints with which the editing user is most strongly associated, as delineated by the exemplary social graph 131, processes executing on the exemplary user computing device 140 can request of those communication endpoints with which the editing user is most strongly associated given that the exemplary digital content 121 was obtained from, for example, a location within the exemplary document database 129 that corresponds to a particular project, a particular group, or other like content metadata. In such an instance, users, and their corresponding communication endpoints, that are known to the exemplary social graph 131 to be a part of that project, or that group, can be returned, as illustrated by the arrow 183, as being most strongly associated with the user editing such exemplary digital content 121, given that such exemplary digital content 121 was obtained from a location corresponding to that project, group, or other like identifying storage location. As another example, processes executing on the exemplary user computing device 140 can request, from the exemplary social server 130, those communication endpoints with which the user is most strongly associated given that the user is editing the exemplary digital content 121 during business hours. In such an instance, the exemplary social graph 131 can assign a greater weight to users that are known to be associated with the editing user in a business context, as opposed to family members, or other like non-business relationships, and those users, or, more specifically, communication endpoints associated therewith, can be returned for purposes of pre-populating the exemplary local cache 170.

Alternatively, or in addition, the exemplary digital content 121, such as the exemplary text 142, can itself be parsed to obtain identifying information that can be utilized to refine the communication endpoints returned by the exemplary social server 130. For example, the exemplary text 142 can reference a particular project, a particular group, or can comprise common boilerplate language, or other like identifying text that can, based in the information available to the exemplary social graph 131, identify specific relationships between the editing user and other users, within the exemplary social graph 131. For example, the exemplary text 142 can reference a particular project, and the exemplary social graph 131 can comprise information indicative of the users that are working on such a project. In such an instance, exemplary social graph 131 can return those users, or, more specifically, communication endpoints associated with those users, as being most strongly associated with the editing user, given the digital content 121 that the user is editing.

According to another aspect, the exemplary digital content 121, such as exemplary text 142, can itself be parsed to identify communicational endpoints directly referenced therein. For example, as illustrated by the arrow 185, a specific user, alias, text messaging identifier, or other like communication endpoint can be textually referenced within the exemplary text 142. Such a communicational endpoint can also be added to the exemplary local cache 170. As with the communication endpoints obtained from the exemplary social server 130, access rights information corresponding to communication endpoints obtained from the exemplary text 142 itself can be obtained from the exemplary access control list 122. Additionally, as detailed above, the exemplary access control list 122 can be referenced only to the extent that the communicational endpoint does not already have access control information associated with it enumerated in the local cache 170. If the information contained within the exemplary text 142 is ambiguous, such as, for example, if the text 142 references a user by name, a directory server or other like directory information can be consulted to determine whether known communicational endpoints are associated with such a user's name. According to one aspect, if the quantity of such communication endpoints is below a threshold amount, each of such communicational endpoints can be added to the local cache 170. Conversely, according to such an aspect, if the quantity of communication endpoints associated with a name is too high, then it may not be practical to disambiguate the name and it may be more efficient to not add such communication and points to the local cache 170.

According to one aspect, a local cache, such as the exemplary local cache 170, can be generated when digital content, such as exemplary digital content 121, is opened by a user for editing, such as on the exemplary user computing device 140. To avoid an initial flood of communications and requests, the generation of a local cache, such as the exemplary local cache 170, can be delayed by a predetermined amount from the time when the exemplary digital content 121 is opened by user for editing on the exemplary user computing device 140. Alternatively, or in addition, the generation of the local cache, such as exemplary local cache 170, can be triggered only if the exemplary digital content 121 has already been shared, or if some form of access rights to the exemplary digital content 121 have otherwise already been granted to at least one other communicational endpoint. More colloquially, if the exemplary digital content 121 has not previously been shared, then it may not be optimal to incur the processing in generating a local cache, such as exemplary local cache 170, since it may not be likely that exemplary digital content 121 will be shared in the future. Similarly, if the user opening the exemplary digital content 121 for editing on the exemplary user computing device 140 does not typically share content, does not utilize various sharing capabilities, such as those triggered by the exemplary comment 161, or has not utilized within a predetermined amount of time, then, again, the generation of a local cache, such as exemplary local cache 170, need not be performed. Combinations of such optimizations in determining when to generate a local cache, such as exemplary local cache 170, can likewise be utilized.

The local cache 170, once generated, can remain until the user closes the digital content 121, or otherwise stops editing it. According to one aspect, the access rights information contained within the local cache 170 need not be periodically refreshed. According to another aspect, however, the access rights information contained within the local cache 170 can be periodically updated, such as based on an elapsed amount of time since a prior update, by reference to the exemplary access control list 122. According to yet another aspect, the access rights information contained within the local cache 170 can be updated based on triggering events, such as being restored after a crash or other failure, or such as triggering events occurring on other computing devices, such as exemplary document server 120, of which processes executing on the exemplary user computing device 140 can be notified. Moreover, user actions in editing the exemplary digital content 121, on the exemplary user computing device 140, such as a user explicitly responding to the exemplary user interface element 151 to grant a particular communication endpoint access rights to the digital content 121, can be recorded in the local cache 170, as well as the exemplary access control list 122.

According to yet another aspect, rather than refreshing the local cache, a backstop check can be performed, whereby, to account for the possibility that access rights have changed on the document server 120, such as delineated by the exemplary access control list 122, but of which the local cache 170 is unaware, prior to the notification associated with the digital content 121 being transmitted to a recipient communication endpoint, a check can be made to the access control list 122 as to whether the recipient communication endpoint has access rights. In such an instance, the user need not experience a delay since the user is unaware of the actual transmission of the notification in the first place, and it would only be the transmission of the notification that would be delayed by such a backstop check.

Figure 2:
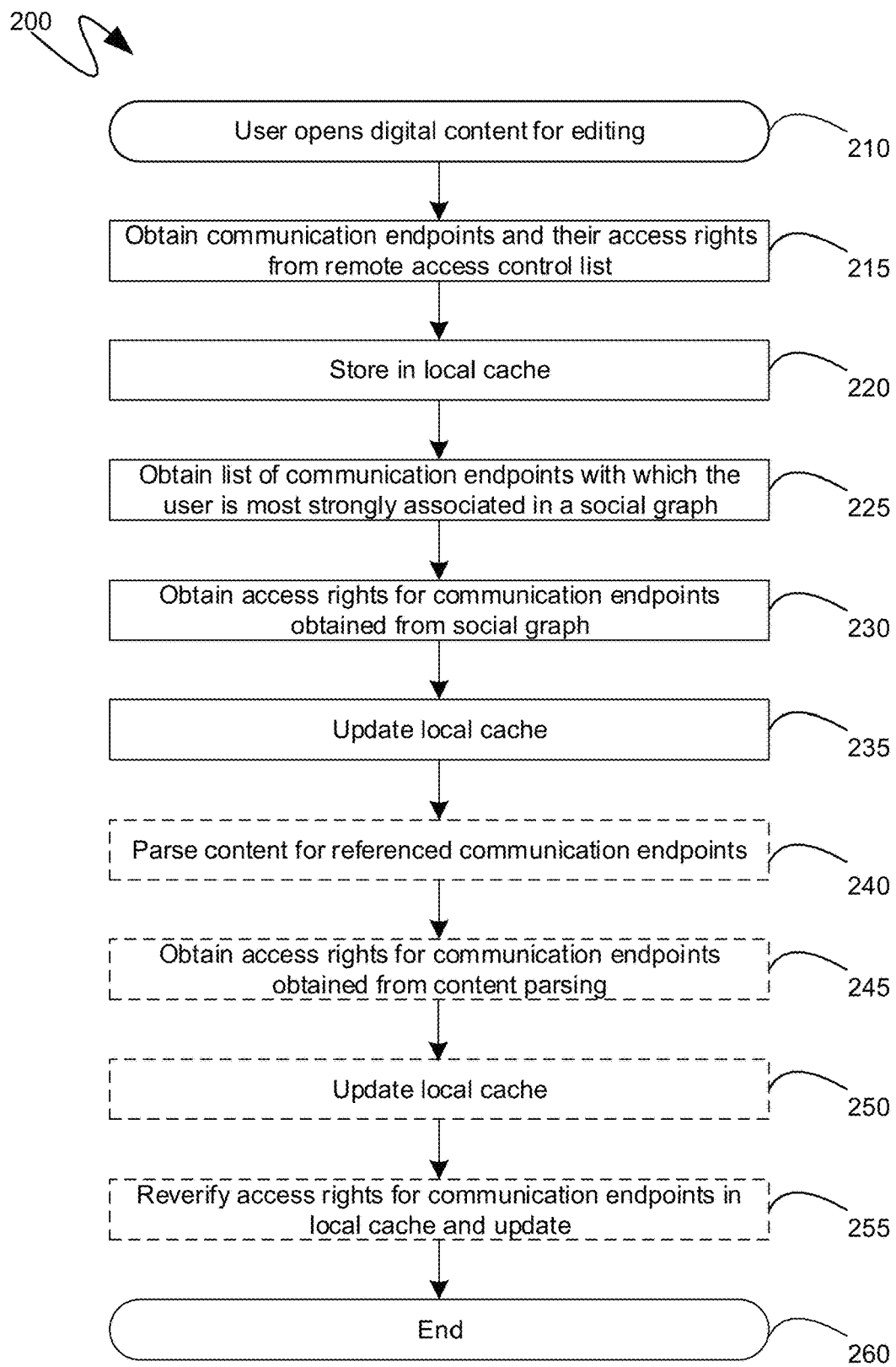
FIG. 2 is a flow diagram of an exemplary series of steps by which access rights to digital content can be locally pre-cached.

Turning to FIG. 2, the exemplary flow diagram 200 shown therein illustrates an exemplary series of steps by which a local cache, such as that illustrated above, can be generated. Initially, as illustrated by step 210, a user can open digital content for editing on a local computing device being utilized by such user. Subsequently, at step 215, communication endpoints, to which access to the digital content opened at step 210 has already been granted, can be obtained from a remote access control list. Such information, namely a communication endpoint individually enumerated in the remote access control list, and the corresponding access control information for such communication endpoint, can be stored in the local cache at step 220.

As detailed above, in addition to locally caching information from the remote access control list, the local cache can comprise access control information associated with communication endpoints that a user is more likely, than other communication endpoints, to subsequently give access to the digital content, such as within the process of editing such digital content. Consequently, at step 225, a social graph can be referenced in one or more communication endpoints can be obtained based on such a social graph. As indicated previously, according to one aspect, the obtaining of communication endpoints, at step 225, can be based on an identity of the user who opened the digital content for editing at step 210. According to another aspect, as also indicated previously, the obtaining of communication endpoints, at step 225, can be further informed by metadata of the digital content that was opened for editing at step 210, or by parsing of such digital content itself. At step 225, therefore, the communication endpoints obtained can be those with which the user is most strongly associated, either based on the user's identity by itself, or in combination with the aforementioned additional information. At step 230, the communication endpoints obtained at step 225 can have corresponding access rights to the digital content determined, such as by reference to the remote access control list. According to one aspect, reference to the remote access control list can be only for those communication endpoints, obtained at step 225, that are not already in the local cache. The local cache can be updated with such access rights information at step 235. According to one aspect, the updating of the local cache, at step 235, can comprise not only updating the local cache with communication endpoints that have access, and corresponding access rights indicators indicating that those communication endpoints have access, but also with communication endpoints that do not have access and corresponding access rights indicators so indicating.

Optionally, as illustrated by the dashes in FIG. 2, the digital content that was opened for editing at step 210 can be parsed to identify communication endpoints, or other information from which communicational endpoints can be derived, that is part of the digital content itself. Should such communication endpoints be obtained or derived from the digital content itself, access rights to the digital content for such communication endpoints can be obtained at step 245 from a remote access control list. The local cache can then be updated at step 250. As before, the updating of the local cache, at step 250, can also comprise updating the local cache with communication endpoints that do not have access and corresponding access rights indicators so indicating. Steps 245 and 250, proceeding from step 240, are also, thereby, optional and, correspondingly, are also indicated via dashes in FIG. 2.

The access rights information contained within the local cache can be optionally re-verified with reference to the remote access control list at step 255. Such a re-verification can be triggered based on predetermined triggering events, such as the collapsing of a predetermined amount of time since a prior re-verification, or other like predetermined triggering events. Again, because step 255 is optional, is illustrated in FIG. 2 with dashes. The relevant processing can then end at step 260.

Figure 3:
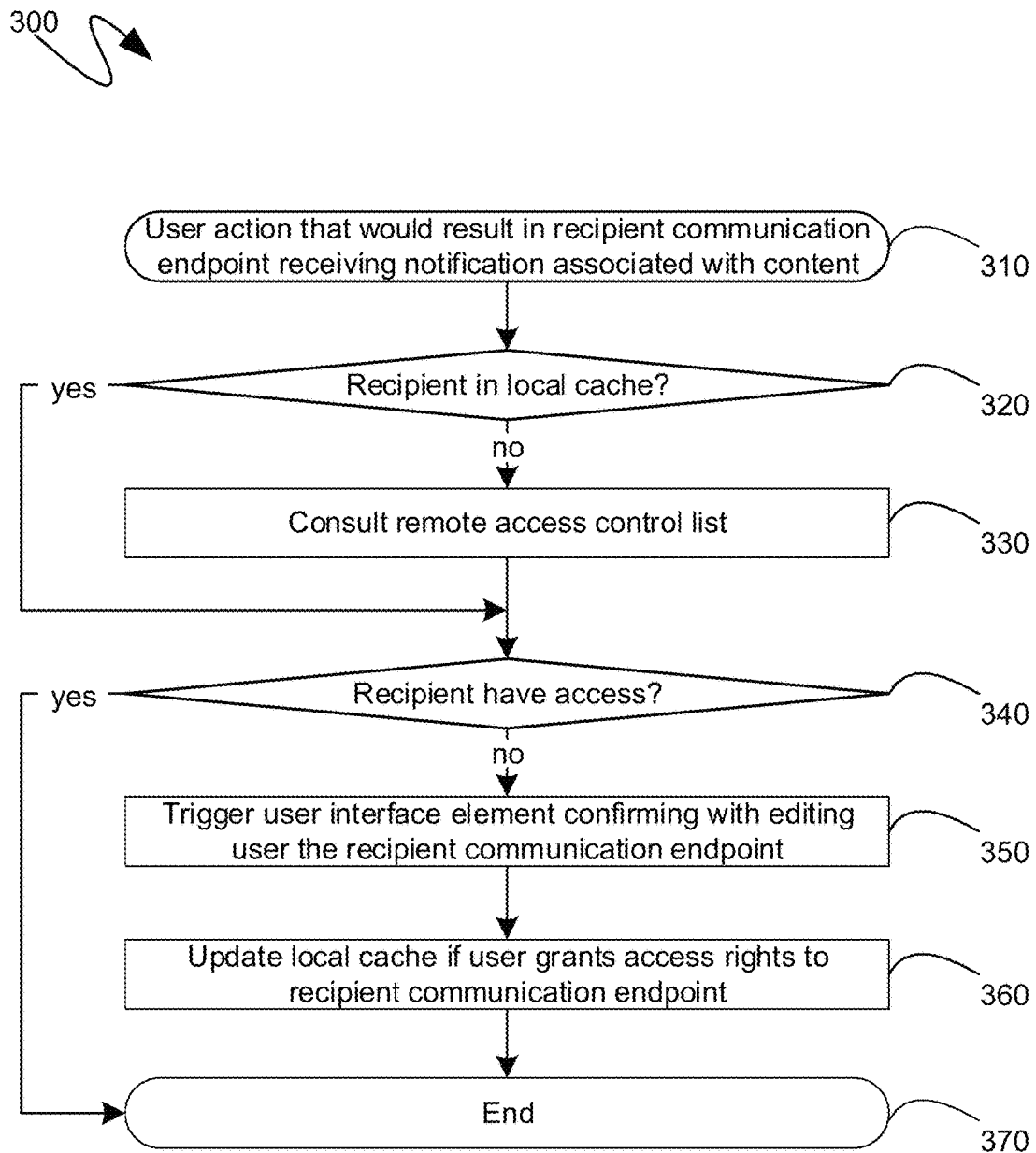
FIG. 3 is a flow diagram of an exemplary series of steps by which locally pre-cached access rights can be referenced to reduce latency.

Turning to FIG. 3, the exemplary flow diagram 300 shown therein illustrates an exemplary series of steps by which a local cache can be utilized to decrease the latency and delay with which access rights to digital content are determined, thereby increasing user efficiency and improving user performance. Initially, at step 310, a user action can be detected, such as within the context of editing digital content, that would result in a recipient communication endpoint receiving a notification associated with such content. For example, such a user action can be the insertion of a comment referencing another user in a predetermined manner, such as by preceding communication endpoint information associated with such a user with a predetermined symbol, such as the "@" symbol. Traditionally, subsequent to step 310, processing would proceed to step 330 and consult a remote access control list in order to determine whether the recipient communication endpoint already had access rights to the digital content in order to determine whether to trigger, such as at step 350, a user interface element by which the editing user can confirm that the recipient communication endpoint should receive the notification associated with the content, at a time prior to such a notification being transmitted, and at a time when an inadvertent disclosure of the digital content, or aspects thereof, or its existence, can be avoided and stopped. However, as detailed above, the performance of step 330 can introduce latency and an unacceptable delay in triggering, at step 350, the user interface element, thereby resulting in user confusion, user inefficiency, and a poor user experience.

By contrast, the mechanisms described herein enable the performance of step 320, subsequent to step 310, at which a local cache can be consulted to determine whether the recipient communication endpoint is enumerated in the local cache. If, at step 320, it is determined that the recipient communication endpoint is not enumerated in the local cache, processing can then proceed to step 330, and the user's experience is no worse than it was before. However, if, at step 320, it is determined that the recipient communication endpoint is enumerated in the local cache, processing can proceed to step 340 where the determination of whether the recipient communication endpoint already has access can be performed based on the local cache, and without incurring the delay attributed to the performance of step 330. The corresponding user interface element can then be toggled, at step 350, or not, depending on the determination at step 340. While the exemplary flow diagram 300 of FIG. 3 illustrates step 350 as being dependent only upon step 340, other considerations can equally influence whether or not the user interface element is triggered at step 350. For example, there can exist certain predefined conditions under which, even if a recipient communication endpoint does not have access rights to the digital content, no user interface elements need be triggered, such as at step 350, because, for example, the specific recipient communication endpoint can be pre-authorized to receive such access rights, and the editing user need not explicitly authorize the sharing of the digital content with such a recipient communication endpoint. For example, an administrator could pre-authorize every member of a defined group to share digital content with the other members of the group. In such an instance, prior to executing steps 320 through 350 an initial determination could be made to determine whether the recipient communication endpoint is one of the members of the defined group. If the recipient communication endpoint is one of the members of the defined group, there may be no need to perform steps 320 through 350, since no explicit user authorization would be required to provide access rights to such a recipient communication endpoint and, instead, the access rights to the recipient communication endpoint, being one of the members of the defined group, could simply be automatically provided in response the user action at step 310.

According to one aspect, if the user interacts with the user interface element triggered at step 350, and, either through such a user interface element, or through other user interface mechanisms, does grant access rights to the recipient communication endpoint, the local cache can be updated, such as at step 360, to include the recipient communication endpoint and an access right indicator corresponding to the recipient communication endpoint indicating that the recipient communication endpoint now has access rights. Although not specifically illustrated exemplary flow diagram 300 of FIG. 3, the remote access control list can, as traditionally, be updated to reflect the user's granting of access rights to the recipient communication endpoint. However, by updating the local cache, at step 360, subsequent performances of the exemplary steps of the flow diagram 300 of FIG. 3 can be more likely to avoid step 330, and the latency, delay, and inefficient user experience associated therewith. The relevant processing can then end at step 370.

Figure 4:
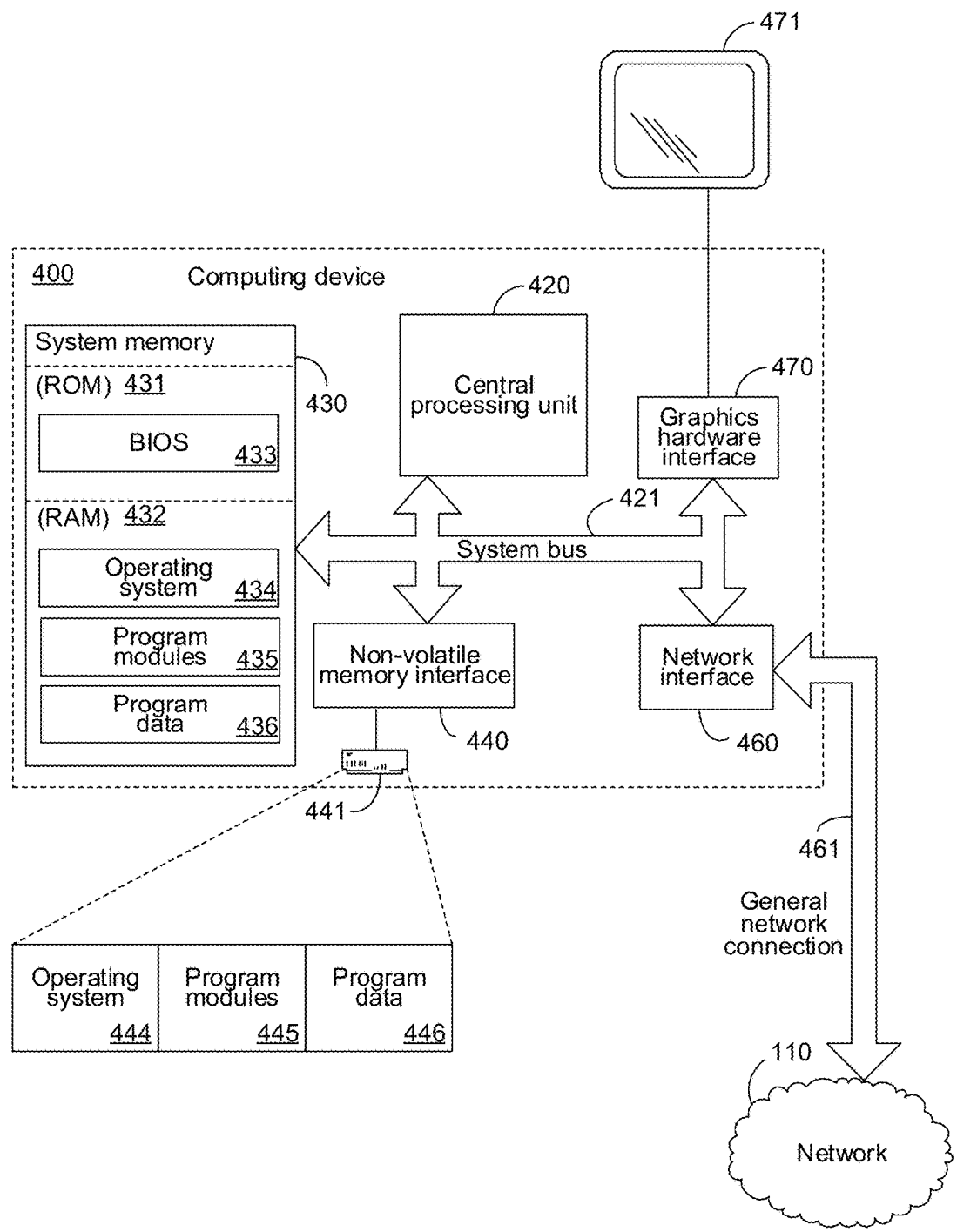
FIG. 4 is a block diagram of an exemplary computing device.

Turning to FIG. 4, an exemplary computing device 400 is illustrated which can perform some or all of the mechanisms and actions described above. The exemplary computing device 400 can include, but is not limited to, one or more central processing units (CPUs) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. The computing device 400 can optionally include graphics hardware, including, but not limited to, a graphics hardware interface 470 and a display device 471, which can include display devices capable of receiving touch-based user input, such as a touch-sensitive, or multi-touch capable, display device. Depending on the specific physical implementation, one or more of the CPUs 420, the system memory 430 and other components of the computing device 400 can be physically co-located, such as on a single chip. In such a case, some or all of the system bus 421 can be nothing more than silicon pathways within a single chip structure and its illustration in FIG. 4 can be nothing more than notational convenience for the purpose of illustration.

The computing device 400 also typically includes computer readable media, which can include any available media that can be accessed by computing device 400 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 400. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer content between elements within computing device 400, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, other program modules 435, and program data 436.

The computing device 400 may also include other removable/non-removable, volatile/nonvolatile computer storage media. By way of example only, FIG. 4 illustrates a hard disk drive 441 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 441 is typically connected to the system bus 421 through a non-volatile memory interface such as interface 440.

The drives and their associated computer storage media discussed above and illustrated in FIG. 4, provide storage of computer readable instructions, data structures, program modules and other data for the computing device 400. In FIG. 4, for example, hard disk drive 441 is illustrated as storing operating system 444, other program modules 445, and program data 446. Note that these components can either be the same as or different from operating system 434, other program modules 435 and program data 446. Operating system 444, other program modules 445 and program data 446 are given different numbers hereto illustrate that, at a minimum, they are different copies.

The computing device 400 may operate in a networked environment using logical connections to one or more remote computers. The computing device 400 is illustrated as being connected to the general network connection 461 through a network interface or adapter 460, which is, in turn, connected to the system bus 421. In a networked environment, program modules depicted relative to the computing device 400, or portions or peripherals thereof, may be stored in the memory of one or more other computing devices that are communicatively coupled to the computing device 400 through the general network connection 461. It will be appreciated that the network connections shown are exemplary and other means of establishing a communications link between computing devices may be used.

Although described as a single physical device, the exemplary computing device 400 can be a virtual computing device, in which case the functionality of the above-described physical components, such as the CPU 420, the system memory 430, the network interface 460, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 400 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example is a method of reducing latency in determining access rights to a first digital content, the method comprising: obtaining, from a remote access control list corresponding to a first content, a first set of communication endpoints that have access rights to the first content, the obtaining being performed after a user opens the first content for editing; generating a local cache, on the computing device, comprising the first set of communication endpoints and a first set of access rights indicators indicating that the first set of communication endpoints have access rights to the first content; obtaining a second set of communication endpoints, the second set of communication endpoints being those communication endpoints with which the user is most strongly associated in a social graph that delineates relationships between users based at least in part on prior actions of those users, wherein each user in the social graph is associated with at least one communication endpoint; obtaining, from the remote access control list, whether at least some of the second set of communication endpoints have the access rights to the first content; updating the local cache with a first subset of the second set of communication endpoints and a second set of access rights indicators indicating that the first subset of the second set of communication endpoints have the access rights to the first content, wherein the first subset of the second set of communication endpoints are those of the at least some of the second set of communication endpoints that were identified, by the remote access control list, to have the access rights to the first content; and determining, by checking the local cache, whether a recipient communication endpoint, that will receive a notification associated with the first content due to a user action with respect to the first content, already has the access rights to the first content.

A second example is the method of the first example, wherein the obtaining, from the remote access control list, the first set of communication endpoints is performed after a predetermined delay after the user opens the first content for editing.

A third example is the method of the first example, wherein each communication endpoint specifies either a single computing device or a single individual user.

A fourth example is the method of the first example, wherein the strength of the association between the user and the second set of communication endpoints, in the social graph, is informed by metadata of the first content.

A fifth example is the method of the fourth example, wherein the metadata of the first content comprises a location, on a document share, from which the first content was opened by the user for editing.

A sixth example is the method of the first example, wherein the strength of the association between the user and the second set of communication endpoints, in the social graph, is informed by portions the first content itself.

A seventh example is the method of the first example, wherein the at least some of the second set of communication endpoints, for which the access rights to the first content are obtained from the remote access control list, comprises those of the second set of communication endpoints whose access rights to the first content were not already identified in the local cache.

An eighth example is the method of the first example, further comprising: further update the local cache with a second subset of the second set of communication endpoints and a third set of access rights indicators indicating that the second subset of the second set of communication endpoints does not have the access rights to the first content; wherein the second subset of the second set of communication endpoints are those of the at least some of the second set of communication endpoints that were identified to not have the access rights to the first content by the remote access control list in response to the obtaining, from the remote access control list, whether the at least some of the second set of communication endpoints have the access rights to the first content.

A ninth example is the method of the first example, further comprising: determining whether the recipient communication endpoint already has the access rights to the first content by referencing the remote access control list only after referencing the local cache and only if the local cache does not comprise information indicative of whether the recipient communication endpoint has the access rights to the first content.

A tenth example is the method of the first example, further comprising: triggering a user interface to be generated on a display device communicationally coupled to a computing device being utilized by the user to edit the first content if the determining determines that the recipient communication endpoint does not have the access rights to the first content, wherein the user interface notifies the user that the recipient communication endpoint does not have the access rights to the first content.

An eleventh example is the method of the first example, further comprising: re-checking, by referencing the remote access control list, whether communication endpoints in the local cache have the access rights; and updating corresponding access rights indicators in the local cache; wherein the re-checking and updating are performed in response to a pre-defined triggering event.

A twelfth example is the method of the eleventh example, wherein the pre-defined triggering event is an elapsing of a pre-defined amount of time since the user opened the first content for editing.

A thirteenth example is the method of the first example, wherein the obtaining the second set of communication endpoints is limited by a pre-determined threshold maximum quantity of communication endpoints.

A fourteenth example is the method of the first example, wherein the obtaining the second set of communication endpoints is limited by a pre-determined threshold minimum strength of relationship with the user.

A fifteenth example is the method of the first example, wherein the method is only performed if the access rights to the first content have already been granted to one other communication endpoint prior to the user opening the first content for editing.

A sixteenth example is the method of the first example, wherein the method is only performed if the user has previously utilized an access rights sharing feature of an application with which the user opened the first content for editing.

A seventeenth example is the method of the first example, further comprising: parsing the first content to identify a third set of communication endpoints textually enumerated by the first content itself; obtaining, from the remote access control list, whether at least some of the third set of communication endpoints have the access rights to the first content; and updating the local cache with a first subset of the third set of communication endpoints and a third set of access rights indicators indicating that the first subset of the third set of communication endpoints have the access rights to the first content, wherein the first subset of the third set of communication endpoints are those of the at least some of the third set of communication endpoints that were identified, by the remote access control list, to have the access rights to the first content.

An eighteenth example is a computing device comprising: one or more processing units; and one or more computer-readable media comprising computer-executable instructions which, when executed by the one or more processing units, cause the computing device to: obtain, from a remote access control list corresponding to a first content, a first set of communication endpoints that have access rights to the first content, the obtaining being performed after a user of the computing device opens the first content for editing; generate a local cache, on the computing device, comprising the first set of communication endpoints and a first set of access rights indicators indicating that the first set of communication endpoints have the access rights to the first content; obtain a second set of communication endpoints, the second set of communication endpoints being those communication endpoints with which the user is most strongly associated in a social graph that delineates relationships between users based at least in part on prior actions of those users, wherein each user in the social graph is associated with at least one communication endpoint; obtain, from the remote access control list, whether at least some of the second set of communication endpoints have the access rights to the first content; update the local cache with a first subset of the second set of communication endpoints and a second set of access rights indicators indicating that the first subset of the second set of communication endpoints have the access rights to the first content, wherein the first subset of the second set of communication endpoints are those of the at least some of the second set of communication endpoints that were identified, by the remote access control list, to have the access rights to the first content; and determine, by referencing the local cache, whether a recipient communication endpoint, that will receive a notification associated with the first content due to a user action with respect to the first content, already has the access rights to the first content.

A nineteenth example is the computing device of the eighteenth example, wherein the one or more computer-readable media comprise further computer-executable instructions which, when executed by the one or more processing units, cause the computing device to further update the local cache with a second subset of the second set of communication endpoints and a third set of access rights indicators indicating that the second subset of the second set of communication endpoints does not have the access rights to the first content; wherein the second subset of the second set of communication endpoints are those of the at least some of the second set of communication endpoints that were identified to not have the access rights to the first content by the remote access control list in response to the obtaining, from the remote access control list, whether the at least some of the second set of communication endpoints have the access rights to the first content.

A twentieth example is one or more computer-readable storage media comprising computer-executable instructions which, when executed by one or more processing units, cause the one or more processing units to: obtain, from a remote access control list corresponding to a first content, a first set of communication endpoints that have access rights to the first content, the obtaining being performed after a user opens the first content for editing; generate a local cache, on the computing device, comprising the first set of communication endpoints and a first set of access rights indicators indicating that the first set of communication endpoints have the access rights to the first content; obtain a second set of communication endpoints, the second set of communication endpoints being those communication endpoints with which the user is most strongly associated in a social graph that delineates relationships between users based at least in part on prior actions of those users, wherein each user in the social graph is associated with at least one communication endpoint; obtain, from the remote access control list, whether at least some of the second set of communication endpoints have the access rights to the first content; update the local cache with a first subset of the second set of communication endpoints and a second set of access rights indicators indicating that the first subset of the second set of communication endpoints have the access rights to the first content, wherein the first subset of the second set of communication endpoints are those of the at least some of the second set of communication endpoints that were identified, by the remote access control list, to have the access rights to the first content; and determine, by referencing the local cache, whether a recipient communication endpoint, that will receive a notification associated with the first content due to a user action with respect to the first content, already has the access rights to the first content.

As can be seen from the above descriptions, mechanisms for utilizing a predictive local pre-cache to reduce latency in determining access rights to digital content have been presented. In view of the many possible variations of the subject matter described herein, we claim as our invention all such embodiments as may come within the scope of the following claims and equivalents thereto.

I claim:

1. A method of reducing latency between a user action, by a user on a computing device, directed to a first content and a generation, by the computing device, of a user notification associated with the user action, the method comprising:
obtaining, by the computing device, from a remote access control list corresponding to a first content, a first set of communication endpoints that have access rights to the first content;
generating a local cache, on the computing device, comprising the first set of communication endpoints and a first set of access rights indicators indicating whether or not that the first set of communication endpoints have access rights to the first content;
obtaining, by the computing device, from a social graph, a second set of communication endpoints, the second set of communication endpoints being selected based on degrees of separation from the user in the a-social graph, the social graph delineating relationships between users based at least in part on prior actions of those users, wherein each user in the social graph is associated with at least one communication endpoint;
obtaining, by the computing device, from the remote access control list, indications of whether or not the second set of communication endpoints have the access rights to the first content;
updating, on the computing device, the local cache with the second set of communication endpoints and a second set of access rights indicators indicating whether or not the second set of communication endpoints have the access rights to the first content based on the indications obtained from the remote access control list;
determining, by the computing device, whether a recipient communication endpoint, that will receive a notification associated with the first content due to the user action, already has the access rights to the first content, the determining comprising:
first checking the local cache; and
subsequently checking the remote access control list if the first checking determines that the local cache does not comprise the recipient communication endpoint; and
generating, by the computing device, the user notification if the recipient communication endpoint does not have the access rights to the first content;
wherein, if the local cache comprises the recipient communication endpoint, the generating is performed without waiting for the subsequently checking the remote access control list, thereby reducing the latency between the user action and the generating the user notification.

2. The method of claim 1, wherein the obtaining, from the remote access control list, the first set of communication endpoints is performed after a predetermined delay after the user opens the first content for editing.

3. The method of claim 1, wherein each communication endpoint specifies either a single computing device or a single individual user.

4. The method of claim 1, wherein the degrees of separation between the user and the second set of communication endpoints, in the social graph, are informed by metadata of the first content.

5. The method of claim 4, wherein the metadata of the first content comprises a location, on a document share, from which the first content was opened by the user for editing.

6. The method of claim 1, wherein degrees of separation between the user and the second set of communication endpoints, in the social graph, is informed by portions the first content itself.

7. The method of claim 1, wherein the user notification notifies the user that the recipient communication endpoint does not have the access rights to the first content.

8. The method of claim 1, further comprising:
re-checking, by referencing the remote access control list, whether communication endpoints in the local cache have the access rights; and
updating corresponding access rights indicators in the local cache;
wherein the re-checking and updating are performed in response to a pre-defined triggering event.

9. The method of claim 8, wherein the pre-defined triggering event is an elapsing of a pre-defined amount of time since the user opened the first content for editing.

10. The method of claim 1, wherein the obtaining the second set of communication endpoints is limited by a pre-determined threshold maximum quantity of communication endpoints in the local cache.

11. The method of claim 1, wherein the obtaining the second set of communication endpoints is limited by a pre-determined threshold minimum degrees of separation from the user.

12. The method of claim 1, wherein the method is only performed if the access rights to the first content have already been granted to one other communication endpoint prior to the user opening the first content for editing.

13. The method of claim 1, wherein the method is only performed if the user has previously utilized an access rights sharing feature of an application with which the user opened the first content for editing.

14. The method of claim 1, further comprising:
parsing the first content to identify a third set of communication endpoints textually enumerated by the first content itself;
obtaining, from the remote access control list, indicators indicating whether or not the third set of communication endpoints have the access rights to the first content; and
updating the local cache with the third set of communication endpoints and a third set of access rights indicators indicating whether the third set of communication endpoints have the access rights to the first content.

15. The method of claim 1, wherein at least some of the second set of access right indicators indicate that corresponding ones of the second set of communication endpoints do not have access rights to the first content.

16. The method of claim 1, wherein the subsequently checking the remote access control list is not performed if the first checking determines that the local cache does comprise the recipient communication endpoint.

17. A computing device comprising:
one or more processing units; and
one or more computer-readable media comprising computer-executable instructions which, when executed by the one or more processing units, cause the computing device to:
obtain, from a remote access control list corresponding to a first content, a first set of communication endpoints that have access rights to the first content;

generate a local cache, on the computing device, comprising the first set of communication endpoints and a first set of access rights indicators indicating whether or not the first set of communication endpoints have the access rights to the first content;

obtain, from a social graph, a second set of communication endpoints, the second set of communication endpoints being selected based on degrees of separation from the user in the social graph, the social graph delineating relationships between users based at least in part on prior actions of those users, wherein each user in the social graph is associated with at least one communication endpoint;

obtain, from the remote access control list, indications of whether or not the second set of communication endpoints have the access rights to the first content;

update the local cache with the second set of communication endpoints and a second set of access rights indicators indicating whether or not the second set of communication endpoints have the access rights to the first content based on the indications obtained from the remote access control list;

determine, whether a recipient communication endpoint, that will receive a notification associated with the first content due to a user action with respect to the first content, already has the access rights to the first content, the determining comprising:
  first checking the local cache; and
  subsequently checking the remote access control list if the first checking determines that the local cache does not comprise the recipient communication endpoint; and generate, a user notification if the recipient communication endpoint does not have the access rights to the first content;

wherein, if the local cache comprises the recipient communication endpoint, the generating is performed without waiting for the subsequently checking the remote access control list, thereby reducing the latency between the user action and the generating the user notification.

18. The computing device of claim 17, wherein the subsequently checking the remote access control list is not performed if the first checking determines that the local cache does comprise the recipient communication endpoint.

19. One or more computer-readable storage media comprising computer-executable instructions which, when executed by one or more processing units, cause the one or more processing units to:

obtain, from a remote access control list corresponding to a first content, a first set of communication endpoints that have access rights to the first content;

generate a local cache, on the computing device, comprising the first set of communication endpoints and a first set of access rights indicators indicating whether or not the first set of communication endpoints have the access rights to the first content;

obtain, from a social graph, a second set of communication endpoints, the second set of communication endpoints being selected based on degrees of separation from the user in the social graph, the social graph delineating relationships between users based at least in part on prior actions of those users, wherein each user in the social graph is associated with at least one communication endpoint;

obtain, from the remote access control list, indications of whether or not the second set of communication endpoints have the access rights to the first content;

update the local cache with the second set of communication endpoints and a second set of access rights indicators indicating whether or not second set of communication endpoints have the access rights to the first content based on the indications obtained from the remote access control list;

determine, whether a recipient communication endpoint, that will receive a notification associated with the first content due to a user action with respect to the first content, already has the access rights to the first content, the determining comprising:
  first checking the local cache; and
  subsequently checking the remote access control list if the first checking determines that the local cache does not comprise the recipient communication endpoint; and generate, a user notification if the recipient communication endpoint does not have the access rights to the first content;

wherein, if the local cache comprises the recipient communication endpoint, the generating is performed without waiting for the subsequently checking the remote access control list, thereby reducing the latency between the user action and the generating the user notification.

20. The computer-readable storage media of claim 19, wherein the subsequently checking the remote access control list is not performed if the first checking determines that the local cache does comprise the recipient communication endpoint.

* * * * *